April 19, 1927.
C. T. PATTERSON
MOISTURE GUIDE FOR INCUBATORS
Filed May 16, 1924
1,625,420
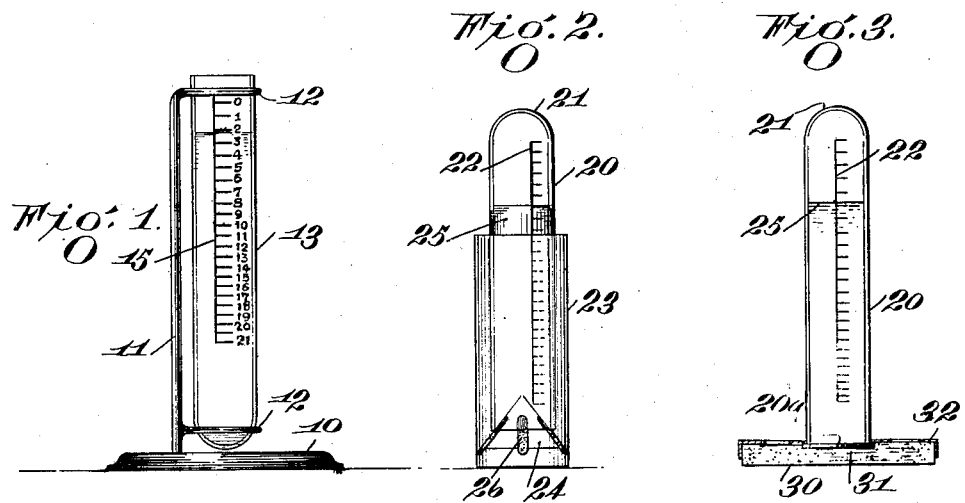
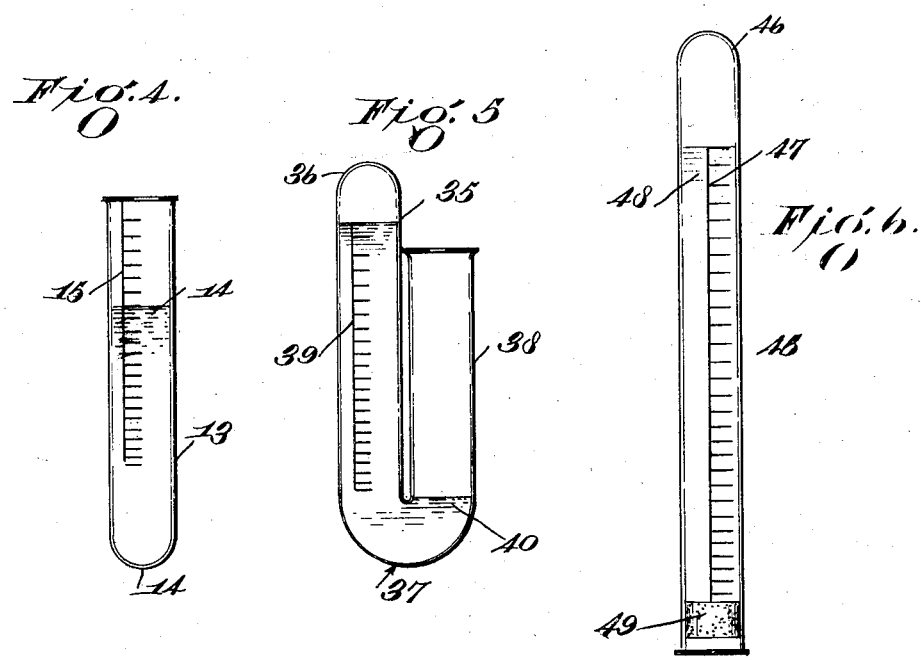

Patented Apr. 19, 1927.

UNITED STATES PATENT OFFICE.

CHARLEY THOMAS PATTERSON, OF SPRINGFIELD, MISSOURI.

MOISTURE GUIDE FOR INCUBATORS.

Application filed May 16, 1924. Serial No. 713,798.

This invention relates to a moisture guide for use with incubators and serves to provide the operator of the incubator with a direct and accurate reading showing the rate and amount of evaporation actually occurring in the incubator.

It is well known that a certain amount of the water in an egg should evaporate during the process of incubation. Too much moisture or not enough moisture are both detrimental to hatching chicks. It is, therefore, important for the operator of the incubator to ascertain daily the rate of evaporation actually occurring in the incubator and also to know at all times the accumulated or aggregate amount of evaporation that has taken place. In an endeavor to meet these conditions hygrometers have been proposed which measure the degree of moisture in the atmosphere and humidors have been proposed to supply certain quantities of moisture to the air. These expedients have not, however, proven capable of successfully dealing with the problems presented and their failure can be understood when it is considered that the temperature and the volume of air in the incubator are factors in evaporation as well as the humidity of the air.

In order to overcome these difficulties and successfully deal with the conditions presented, the present invention proposes to directly measure the rate and amount of evaporation which actually occurs in the incubator whereby due regard is given to all of the factors controlling evaporation. Since the rate and amount of evaporation occurring in the incubator is parallel to that occurring in the eggs, the operator is afforded with a direct and accurate guide which enables a proper control of the process of incubation to be exercised.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view in elevation showing one embodiment of the invention together with its supporting stand, Figure 2 is a view in elevation of another form of the invention, Figure 3 is a view partly in elevation and partly in section of still another form of the invention, Figure 4 is a view in elevation showing the embodiment of the invention illustrated in Figure 1 with the supporting stand omitted, Figure 5 is a view in elevation of yet another form of the invention, and Figure 6 is a view in elevation of another embodiment of the invention.

Referring to the drawings wherein for the sake of illustration is shown a number of embodiments of the invention and with reference especially to the form of the invention illustrated in Figs. 1 to 4, the numeral 10 designates the base or supporting stand having a standard 11 and supporting clamps 12. A glass tube 13 is supported by the clamps 12 and has its lower end closed, as at 14', and its upper end open. In the tube 13 a liquid 14, such as water or the like, is provided. The liquid 14 must be an evaporative liquid which, however, will not absorb any appreciable amount of moisture from the air. On the glass tube 13 a scale 15 is applied. The glass tube 13 or at least that portion thereof on which the scale 15 is applied is transparent so that the level of liquid in the tube may be viewed from the outside of the tube and may be gaged by comparing the level of the liquid with the graduations on the indicia of the scale. The upper end of the tube being open affords an evaporate surface for the liquid in the tube and in this form of the invention the surface of the liquid itself constitutes the evaporative surface, the open end of the tube constituting the means whereby an evaporative surface is afforded.

With this arrangement the tube 13 is filled with water and the tube and the standard is placed in the incubator. The tube is so constituted and proportioned and the scale 15 is of such a character that the level of the liquid in the tube 13 should fall one graduation or one point a day during the process of incubation, if the proper rate and amount of evaporation is occurring in the eggs. Thus a certain, direct and accurate guide is afforded the operator of the incubator to enable him to properly regulate the conditions controlling evaporation. It is important to note that the check is had on the daily rate of evaporation and also on the accumulated or aggregate amount of evaporation occurring during the entire time of incubation or during any fraction of such time. The invention will thus be readily distinguished from a hygrometer which merely measures the degree of moisture in the atmosphere and which furnishes no sure guide as to the rate and amount of evaporation occurring in its environment.

In the form of the invention shown in Figure 2, an inverted glass tube, designated at 20, is provided and has its lower end open. A scale 22 is applied to the tube 20 and at least that portion of the tube to which the scale is applied is transparent. The tube 20 is arranged in a transparent well 23 on the bottom of which a conical supporting member 24 is positioned. The upper portion of the conical supporting member 24 enters the lower end of the tube 20; whereby the tube is supported. In order to permit liquid 25 contained in the tube 20 to flow into the well 23, a number of grooves 26 are provided in the conical supporting member 24. It will be understood that this arrangement operates on the barometric principle in that the pressure or weight of the air balances the column of liquid in the tube 20, whereby spilling of the liquid is prevented. At the same time means is provided for affording an evaporative surface. This arrangement also operates to measure the rate and amount of the evaporation occurring in the incubator.

The arrangement shown in Figure 3 is exactly the same as that shown in Figure 2, and the description of Figure 2 applies to Figure 3, except that a different type of means is employed for supporting the tube and preventing spilling of the liquid therein while affording an evaporative surface. In Figure 3 a pan or tray 30 of metal or substance impervious to water is provided and carries a pad 31 of porous and absorbent material, such as felt or the like. The lower open end of the tube 20 rests on the pad 31, whereby the pad 31 serves as a closure for the lower open end of the tube. A perforated cover 32 is secured to the pan or tray 30 and engages the flange 20ᵃ of the tube to hold the tube in position.

In Figure 5 a glass tube, designated generally at 35, is provided and has its upper end closed, as at 36. The lower end of the tube 35 is open and connects by means of a curved connecting portion 37 with a second tube 38, the upper end of which is open. The tubes 35 and 38 are arranged parallel and are intended to be supported vertically by means of a suitable stand or support. A scale 39 similar to the scales 15 and 22 is applied to the tube 35. An evaporative liquid 40 is placed in the tubes 35 and 38, as shown in Figure 5 and the column of liquid in the tube 35 is balanced by the pressure or weight of the air exerted through the tube 38. The tube 38 thus provides a barometric arrangement for preventing spilling of liquid and also provides the means whereby an evaporative surface is afforded.

In the form of the invention shown in Figure 6 a simple inverted tube 45 is provided and has its top closed, as at 46, and its bottom open. A scale 47 is applied to the glass tube 45 and an evaporative liquid 48 is contained therein. A closure 49 of absorbent material is provided for the open lower end of the tube 45 and permits the fluid to evaporate while preventing the liquid from spilling.

In all the embodiments of the invention a glass tube is provided which constitutes a receptacle and in this receptacle an evaporative liquid is placed. The tube is formed with an open end or is otherwise equipped with the various means shown in the drawings for affording the liquid with an evaporative surface. Either the glass tubes are transparent or have transparent surfaces or portions to which a scale is applied and the scale affords a direct and accurate reading which indicates the rate and amount of evaporation.

In explanation of the manner in which the instrument constituting the present invention measures the rate of evaporation let it be supposed that at the regular time of the day for observing the moisture guide the water line stood at 10½ and that it was the ninth day of incubation. As the instrument constituting the present invention is designed to show an evaporation corresponding to one space or one graduation a day when the proper evaporation is taking place the reading just noted would mean that evaporation had been going on too fast or at too fast a rate. To correct such conditions additional moisture would have to be supplied to the incubator so that the evaporation would proceed at a slower rate and the slower rate of evaporation would be indicated by the retarded evaporation in the moisture guide. For instance, if enough additional moisture has been supplied the evaporation might have been checked to the extent that a day after the reading noted the water line in the moisture guide would stand at 11¼. This would indicate that the amount of evaporation in one day was three-fourths of one space and if the evaporation was held at this rate the water line would be back with the graduations of the scale by the fifteenth day and at such time less moisture would be used and consequently the evaporation would be more and the rate of evaporation would correspond with the rate prescribed by the standard scale; that is, at the rate of one space a day. Thus while several different rates of evaporation have occurred the accumulated evaporation is in accordance with the scale. It is to be understood that when a space is spoken of it is meant the space between adjacent graduations on the scale of the moisture guide.

I claim:—

1. A moisture guide for use in incubators comprising a liquid container having upon it a guiding scale, the successive graduations of which are so spaced as to indicate the amount of evaporation that should occur from the container in correspondingly successive equal intervals of time to indicate the amount of evaporation that should take place as the incubation progresses.

2. A moisture guide for use in incubators comprising a liquid container having upon it a guiding scale made up of graduations successively changing in spacing to indicate the amount of evaporation that should occur from the container in correspondingly successive equal intervals of time as the incubation period progresses.

3. An evaporation meter including a tube adapted to be disposed within an egg tray and having a series of graduations thereon, the graduations being spaced to correspond with the evaporation of each day and being nearer together as they near the bottom of the tube, and there being a graduation for each day of incubation.

CHARLEY T. PATTERSON.